US012125107B2

(12) United States Patent
Saban

(10) Patent No.: US 12,125,107 B2
(45) Date of Patent: *Oct. 22, 2024

(54) INSURANCE BASED ON DRIVING DATA

(71) Applicant: ALLSTATE INSURANCE COMPANY, Northbrook, IL (US)

(72) Inventor: Yuval Saban, Oak Park, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,777

(22) Filed: Feb. 22, 2022

(65) Prior Publication Data

US 2023/0012298 A1 Jan. 12, 2023

Related U.S. Application Data

(63) Continuation of application No. 14/097,739, filed on Dec. 5, 2013, now Pat. No. 11,257,162.

(51) Int. Cl.
*G06Q 40/08* (2012.01)
(52) U.S. Cl.
CPC ................... *G06Q 40/08* (2013.01)
(58) Field of Classification Search
CPC ..................................................... G06Q 40/08
USPC ............................................................. 705/4
See application file for complete search history.

(56) References Cited

U.S. PATENT DOCUMENTS 5,548,273 A   8/1996   Nicol et al.
6,868,386 B1  3/2005   Henderson et al.
7,339,483 B1  3/2008   Farmer
8,180,655 B1  5/2012   Hopkins, III
8,255,275 B2  8/2012   Collopy et al.
8,595,034 B2  11/2013  Bauer et al.
8,799,036 B1  8/2014   Christensen et al.
(Continued)

FOREIGN PATENT DOCUMENTS

EP       2159122 A2        3/2010
WO    WO-2012080741 A1 *  6/2012  ............. G06F 17/00

OTHER PUBLICATIONS

Authors et al: Lu Zhou; Title: Speed-Based Location Tracking in Usage-Based Automotive Insurance; Pub: IEEE; Date of Conference: Jun. 5-8, 2017; (Year: 2017).*

(Continued)

*Primary Examiner* — Bruce I Ebersman
*Assistant Examiner* — Hatem M Ali
(74) *Attorney, Agent, or Firm* — Polsinelli PC

(57) ABSTRACT

One or more devices in a driving data analysis system may be configured to receive and execute a driving data analysis software application. One or more servers may provide a driving data analysis software application to various driving data analysis devices, such as mobile user devices and/or on-board vehicle systems. The driving data analysis devices may be configured to execute the driving data analysis software application, to receive/collect various driving data, analyze the driving data, and determine eligibility for one or more insurance offers based on the analysis of the driving data. For insurance offers based on driving data, insurance offer vouchers may be generated by the driving data analysis device and transmitted to an insurance provider server to redeem the insurance offer.

15 Claims, 6 Drawing Sheets

(56) References Cited

U.S. PATENT DOCUMENTS

| | | |
|---|---|---|
| 2002/0111725 A1 | 8/2002 | Burge |
| 2008/0270519 A1 | 10/2008 | Ekdahl et al. |
| 2008/0319602 A1 | 12/2008 | Mcclellan et al. |
| 2011/0112717 A1 | 5/2011 | Resner |
| 2012/0185282 A1 | 7/2012 | Gore et al. |
| 2012/0197669 A1 | 8/2012 | Kote et al. |
| 2013/0006675 A1* | 1/2013 | Bowne .................. G01S 19/13 705/4 |
| 2013/0024060 A1 | 1/2013 | Sukkarie et al. |
| 2013/0059607 A1 | 3/2013 | Herz et al. |
| 2014/0046701 A1 | 2/2014 | Steinberg et al. |
| 2014/0379385 A1* | 12/2014 | Duncan ................. G06Q 40/08 705/4 |

OTHER PUBLICATIONS

Authors: Yung Gi Wu; Title: Insurance Assessment Based on the Big Data of Driver Historical Timeline and Car Accident Occurrence; Date of Conference: Oct. 27-28, 2021; (Year: 2021).*

Authors et al: Lu Zhou: Title: Speed-Based Location Tracking in Usage-Based Automotive Insurance; Pub: IEEE; Date of Conference: Jun. 5-8, 2017; (Year: 2017). (Year: 2017).*

Authors: Yung Gi Wu; Title: Insurance Assessment Based on the Big Data of Driver Historical Timeline and Car Accident Occurrence; Date of Conference: Oct. 27-28, 2021; (Year: 2021). (Year: 2021).*

Mar. 15, 2017—(US) Final Office Action—U.S. Appl. No. 14/098,576, 27 Pages.

Dec. 31, 2019—(US) Non-Final Office Action—U.S. Appl. No. 14/098,576, 11 Pages.

"Safe Driver Guide," Bell, 16 Pages.

Duri S., et al., "Data Protection and Data Sharing in Telematics," Mobile Networks and Application no.lications, Kluwer Academic Publishers, Manufactured in The Netherlands, vol. 9, 2004, pp. 693-701.

Lavin S, et al., "Towards an Understanding of Enterprise-Level SOA Adoption: A South African Case Study," International Conference on Information Management and Evaluation, Reading, Academic Conferences International Limited, Apr. 2012, Retrieved from URL: https://www.proquest.com/docview/1034730022/DB42CF05E1A047A3PQ/47accountid, pp. 174-IX, 13 pages.

Rezac M., et al., "Operation of Intelligent Transportation Systems of the City Ostrava in Czech Republic," International Multidisciplinary Scientific GeoConference : SGEM, Sofia vol. 1, Sofia, Surveying Geology & (SGEM), 2013, Retrieved from URL: https://www.proquest.com/docview/1464933800/DB42CF05E1A047A3PQ, pp. 183-190.

Stevens A, et al., "Benefits and Deployment Opportunities for Vehicle/Roadside Cooperative ITS," IET Conference Proceedings, Stevenage, The Institution of Engineering & Technology, Sep. 25, 2012, Retrieved from URL: https://www.proquest.com/docview/1776156167/DB42CF05E1A047A3PQ/5?account, 6 pages.

"Teen Safe Driver Discount," Safeco Insurance, Liberty Mutual Insurance, 2012, 2 Pages.

"Telematics Solutions for Motor Insurance," Wunelli, Retrieved from URL: www.wunelli.com/news.aspx on Jun. 6, 2013, 2 Pages.

"Terms of Business—No Nonsense", No Nonsence Insurance, TOB NN , Retrieved from URL: www.NoNonsence.ie on 2012, 4 Pages.

Victor T., et al., "U34: Driver Distraction: An Inattention-Mitigation Component for Behavior-Based Safety Programs in Commercial Vehicle Operations (IM-BBS)Final Report," NTRCI Incorporated, Unviversity Transportation Center, Sep. 2011, 181 Pages.

* cited by examiner

INSURANCE BASED ON DRIVING DATA

CROSS-REFERENCE TO RELATED APPLICATIONS

The present application is a continuation of U.S. patent application Ser. No. 14/097,739, entitled "INSURANCE BASED ON DRIVING DATA" filed on Dec. 5, 2013, which is incorporated by reference herein in its entirety.

TECHNICAL FIELD

Various aspects of the disclosure generally relate to systems and methods of collecting and analyzing driving data, and determining eligibility for insurance offers based on driving data analyses.

BACKGROUND

As communication technologies, such as wireless communications, Global Position Systems (GPS), and telematics, have progressed, various communication methodologies have been incorporated into automobiles and other mobile devices to monitor vehicle data and driving data. For example, telematics systems such as on-board diagnostics (OBD) systems may be used in automobiles and other vehicles. OBD systems may provide information from the vehicle's on-board computers and sensors, allowing for monitoring of a wide variety of information relating to the vehicle systems, such as engine RPM, emissions control, coolant temperature, vehicle speed, timing advance, throttle position, oxygen sensing, and many other types of data. Vehicles may also include GPS receivers and devices installed within or operating at the vehicle, configured to collect vehicle location and time data. Telematics devices installed within vehicles may be configured to access the vehicle computers, sensor data, and GPS device data and transmit the data to a display within the vehicle, a personal computer or mobile device, or to a centralized data processing system. Additionally, various mobile user devices, such as smartphones and tablet computers, may include GPS receivers and other sensors capable of monitoring movement and location. Certain mobile user devices also may be configured to communicate with vehicle-based systems, so that users may be provided with various vehicle data on their mobile devices, and vice versa.

Data obtained from vehicle-based systems, such as OBD systems and GPS devices, and from mobile user devices, such as smartphones and tablet computers, may be used for a variety of purposes. For example, such data may be used for navigation applications, vehicle tracking and monitoring applications, and vehicle maintenance applications.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media for executing a driving data analysis software application on one or more driving data analysis devices. Insurance provider servers and/or third-party servers may be configured to provide a driving data analysis software application to various devices such as mobile user devices (e.g., smartphones, tablet computers, etc.) or on-board vehicle systems (e.g., on-board diagnostic systems, telematics devices, vehicle control systems, etc.). After downloading and executing a driving data analysis software application, a device may be configured to receive or collect various driving data, to analyze the driving data, and to determine eligibility for one or more insurance offers based on the analysis of the driving data. For insurance offers based on driving data, insurance offer vouchers may be generated by the driving data analysis device and transmitted to an insurance provider server to redeem the insurance offer.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
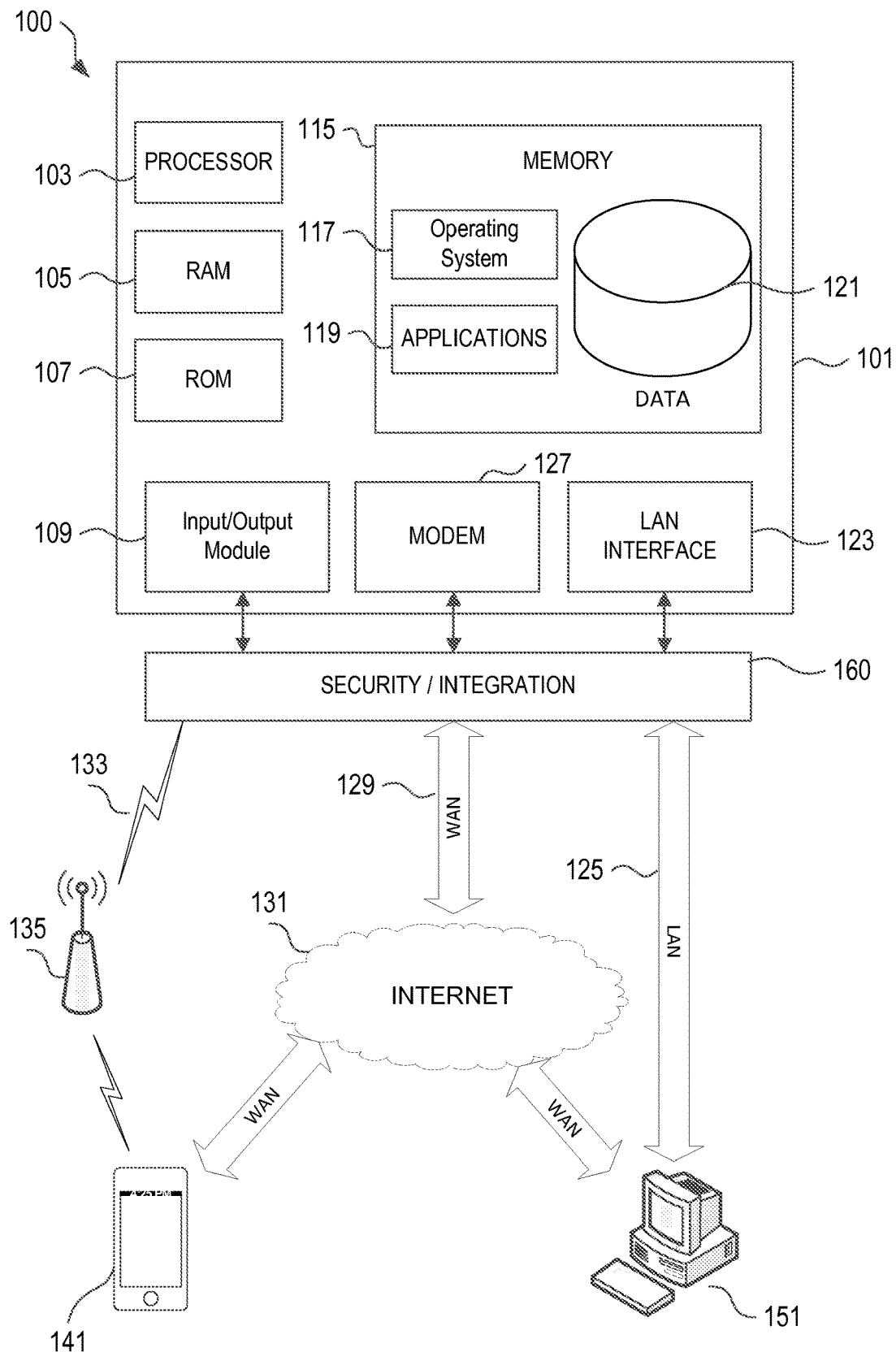
FIG. 1 illustrates a network environment and computer systems that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as an insurance provider server or a driving data analysis computing device, configured as described herein for collecting and analyzing driving data, and determining eligibility for insurance offers based on the analysis of the driving data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. Certain devices/systems within a driving data analysis system may have minimum hardware requirements in order to support sufficient storage capacity, analysis capacity, network communication, etc.

For instance, in some embodiments, one or more non-volatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an insurance provider server 101, a driving data analysis device 101, etc.), in order to store and/or execute a driving analysis software application, receive and process sufficient amounts of driving data for driving analyses, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to execute a driving data analysis software application that receives and stores driving data, analyzes the driving data, and determines eligibility for various insurance offers on an ongoing basis.

The computing device (e.g., a driving data analysis computing device, an insurance provider server, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, on-board vehicle computing systems, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications are sent and managed between the device 101 (e.g., an insurance provider server, a driving data analysis computing device, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of an insurance provider server may comprise a set of web application servers configured to use secure protocols and to insulate the insurance provider server 101 from external devices 141 and 151. In some cases, the security and integration layer 160 may correspond to a set of dedicated hardware and/or software operating at the same physical location and under the control of same entities as insurance provider server 101. For example, layer 160 may correspond to one or more dedicated web servers and network hardware in an insurance provider datacenter or in a cloud infrastructure supporting a cloud-based driving data analysis system. In other examples, the security and integration layer 160 may correspond to separate hardware and software components which may be operated at a separate physical location and/or by a separate entity.

As discussed below, the data transferred to and from various devices in a driving data analysis system 100 may include secure and sensitive data, such as private driving data, insurance offer data and electronic voucher data, and personal user/vehicle data from customers and potential customers. Therefore, it may be desirable to protect transmissions of such data by using secure network protocols and encryption, and also to protect the integrity of the data when stored on an insurance provider server, driving data analysis device, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a driving data analysis system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., driving data, insurance offer data, etc.) between the various devices 101 in the system 100. Web services built to support a driving data analysis system may be cross-domain and/or cross-platform, and may be built for enterprise use. Such web services may be developed in accordance with various web service standards, such as the Web Service Interoperability (WS-I) guidelines. In some examples, a data driving web service or an insurance offer web service may be implemented in the security and integration layer 160 using the Secure Sockets Layer (SSL) or Transport Layer Security (TLS) protocol to provide secure connections between servers 101 and various clients 141 and 151 (e.g., driving data analysis computing devices). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving data database or insurance eligibility offer database) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of driving data analysis systems, such as faster response times and less dependence on network conditions when transmitting/receiving driving analysis software applications (or applications updates), insurance offers and voucher data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and driving data analysis system components described herein may be configured to communicate using any of these network protocols or technologies.

Additionally, one or more application programs 119 may be used by the various computing devices 101 within a driving data analysis system 100 (e.g., driving analysis software applications), including computer executable instructions for receiving and storing driving data associated with an individual or vehicle, determining eligibility for various insurance offers, generating electronic vouchers for insurance offers, and performing other related functions as described herein.

Figure 2A:
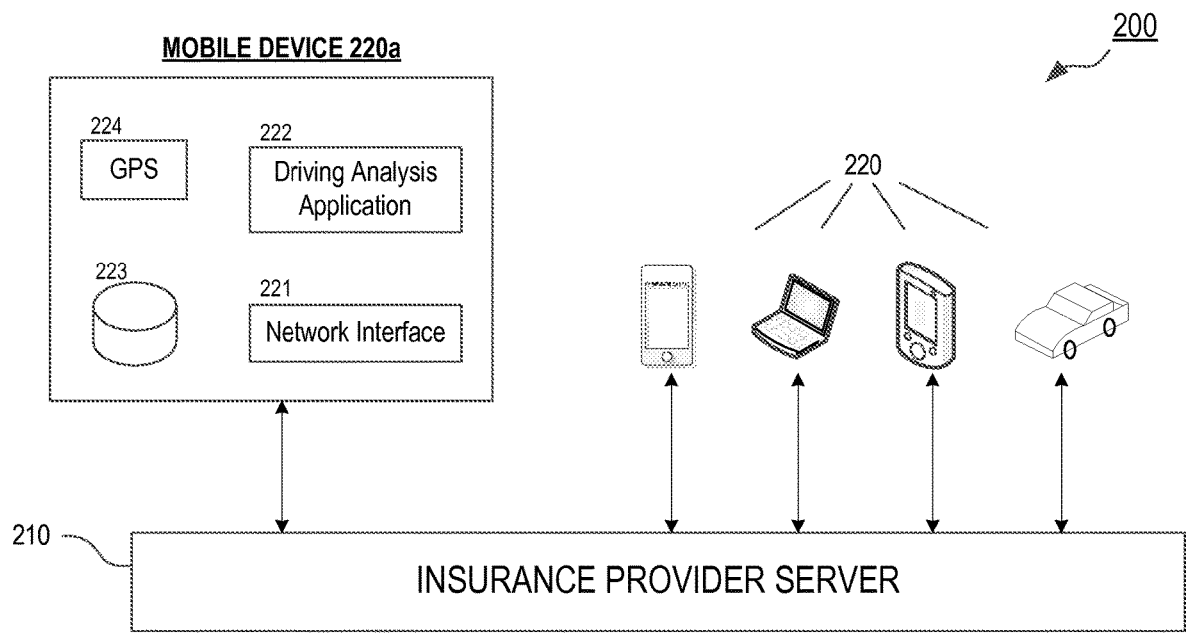
FIGS. 2A-2C are diagrams illustrating the components of various example driving data analysis systems, according to one or more aspects of the disclosure.
Figure 2B:
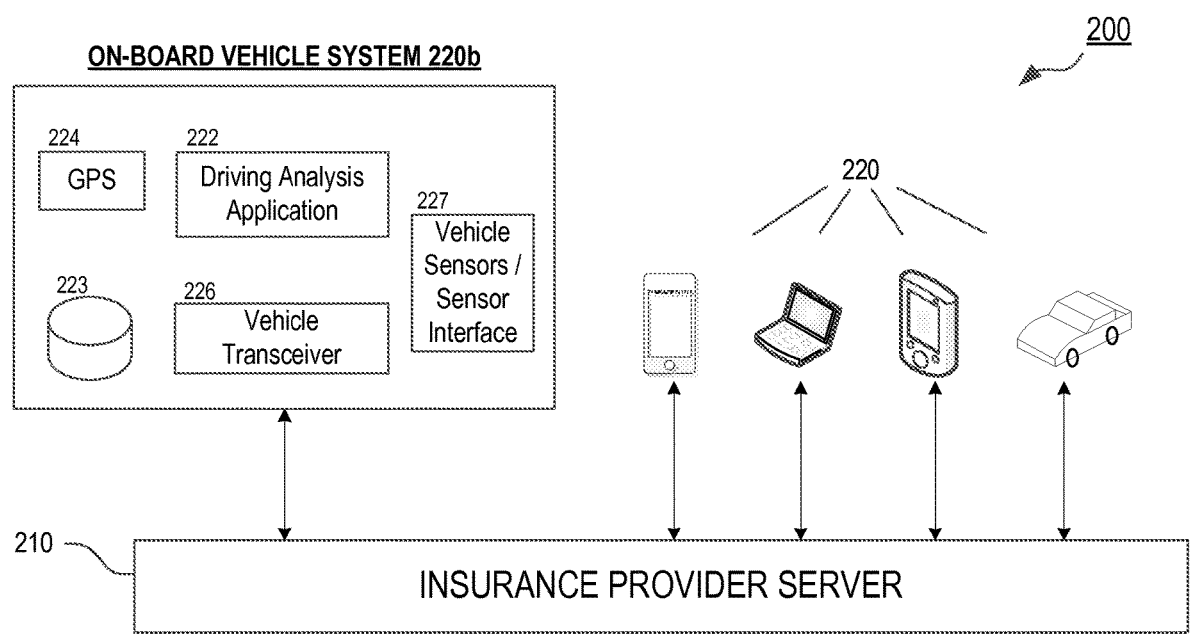
Figure 2C:
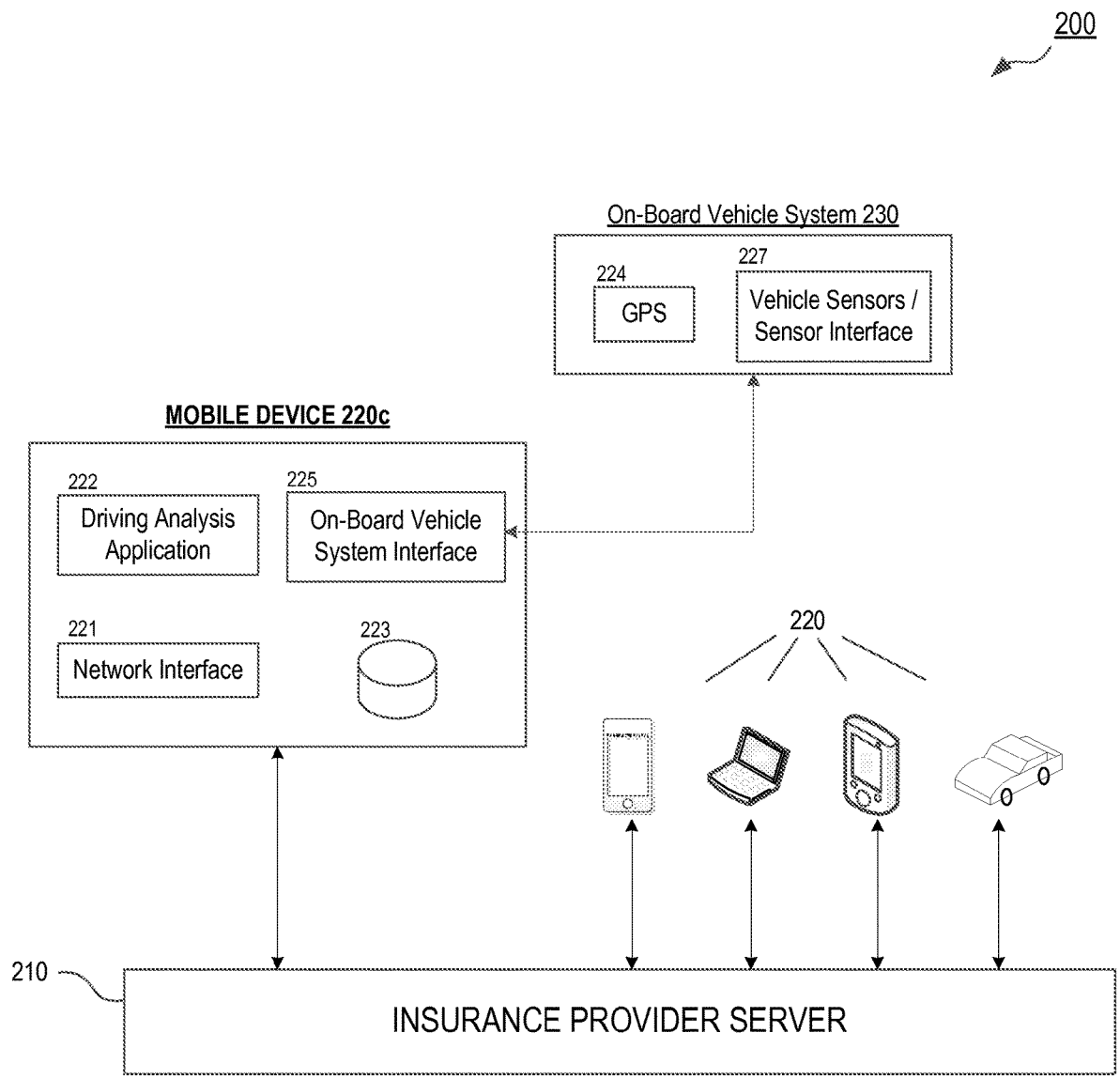

FIGS. 2A-2C are diagrams of illustrative driving data analysis systems 200*a*-200*c*. In each of these example system diagrams, an insurance provider server 210 may communicate with a plurality of different driving data analysis computing devices 220, which may include, for example, mobile user devices 220*a* and on-board vehicle systems 220*b* Each component shown in FIGS. 2A-2C may be implemented in hardware, software, or a combination of the two. Additionally, each component of a driving data analysis system 200 may include a computing device (or system) having some or all of the structural components described above for computing device 101.

Insurance provider server 210 in the driving data analysis systems 200*a*-200*c* may be, for example, a computer server having some or all of the structural components described above for computing device 101. As described below in more detail, an insurance provider server 210 may be configured to provide driving analysis software applications to various computing devices 220, and to receive and process indications of acceptance of insurance offers (e.g., including electronic voucher data) and other data generated by computing devices 220 running the driving analysis software applications. Therefore, in some embodiments, an insurance provider server 210 may include one or more processing units (e.g., single-core, dual-core, or quad-core processors, etc.) having a minimum sufficient bit size (e.g., 32-bit, 64-bit, 96-bit, 128-bit, etc.) and minimum required processor speeds (e.g., 500 MHz, 1 GHz, etc.), and sufficient volatile and nonvolatile memory (e.g., at least 256 MB of RAM, at least 5 GB of memory, etc.), in order to store one or more such driving analysis software applications (e.g., including various different versions, upgrades, etc.), establish communication sessions with and distribute applications to various computing devices 220, and receive and process the indications of acceptance of insurance offers and other data. Additionally, as described below, private and secure data may be transmitted between the insurance provider server 210 and various computing devices 220, such as electronic voucher data and other insurance offer data, private user/vehicle data, personal driving data, etc. Therefore, in some embodiments, an insurance provider server 210 may include various security and/or integration components (e.g., web servers, authentication servers) and/or various network components (e.g., firewalls, routers, gateways, load balancers, etc.). The insurance provider server 210 also may provide and/or require communications over certain secure protocols or encryption techniques (e.g., FTP or SFTP, PGP, HTTP or HTTPS, SOAP, XML encryption, etc.), in order to protect the private or secure data transmitted between the insurance provider server 210 and various computing devices 220.

The driving data analysis system 200 in these examples may also include a plurality of driving data analysis computing devices 220. Each driving data analysis device 220 may potentially receive and execute a driving analysis software application 222 from the insurance provider 210 or other application provider. Within the execution of the driving analysis software application 222, or implemented as separate functionality, driving data analysis device 220 may collect and/or receive vehicle driving data associated with one or more users or vehicles. The driving analysis software application 222 may analyze the driving data, determine eligibility for one or more insurance offers, and may generate insurance offer data (e.g., electronic vouchers) that may be used by associated users or vehicles. Accordingly, in some embodiments, a driving data analysis device 220 may include one or more processing units having a minimum sufficient bit size (e.g., 32-bit, 64-bit, etc.) and minimum required processor speeds (e.g., 233 MHz, 500 MHz, etc.), and sufficient volatile and nonvolatile memory (e.g., at least 256 MB of RAM, at least 1 GB of memory, etc.), in order to store and execute one or more such driving analysis software applications, and to establish communication sessions with an insurance provider server 210 and/or various other devices (e.g., on-board vehicle systems, third-party driving data servers, etc.) to transmit or receive driving data, insurance offer data, etc. Additionally, the driving data analysis devices 220 may receive and transmit private or secure data, such as electronic vouchers and other insurance offer data, private user/vehicle data, personal driving data, etc. Therefore, in some embodiments, driving data analysis devices 220 may include various network components (e.g., firewalls, routers, gateways, load balancers, etc.), and may provide and/or require communications over certain secure protocols or encryption techniques (e.g., FTP or SFTP, PGP, HTTP or HTTPS, SOAP, XML encryption, etc.)

As shown in FIGS. 2A-2C, driving data analysis devices 220 may include a variety of different types of devices, including mobile user devices (e.g., smartphones, personal digital assistants, tablet computers, etc.), and on-board vehicle systems (e.g., telematics devices, vehicle computers and on-board diagnostics systems, etc.). An example mobile device 220a is shown in FIG. 2A, illustrating certain components that may be included in various driving analysis devices 220.

In FIG. 2A, mobile device 220a, which may be a smartphone, personal digital assistant, or tablet computer, etc., may include some or all of the elements described above with respect to the computing device 101. Additionally, mobile device 220a may include a network interface 221, which may include various network interface hardware (e.g., adapters, modems, wireless transceivers, etc.) and software components to enable mobile device 220a to communicate with an insurance provider server 210 and various other external computing devices. As shown in FIG. 2A, a driving analysis software application 222 may be stored in the memory of the mobile device 220a. The driving analysis software application 222 may be received via network interface 221 from the insurance provider server 210 or other application provider (e.g., an application store). As discussed below, the driving analysis software application 222 may or may not include various user interface screens, and may be configured to run as a user-initiated application or as a background application. The memory of the mobile device 220a also may include a database 223 configured to receive and store driving data associated with one or more users and/or vehicles. In some examples, the driving data database 223 may exist within the application memory for the driving analysis software application 222, and in other examples may be stored separately as persistent data within the device memory.

Mobile device 220a may include various components configured to generate and/or receive driving data. For example, using data from the GPS receiver 224, the driving analysis software application 222 may be able to identify starting and stopping points of driving trips, determine driving speeds, times, routes, and the like. Additional components of mobile device 220a may be used to generate or receive driving data for the driving data analysis applications 222, such as an accelerometer, compass, and various cameras and proximity sensors (not shown in FIG. 2). As discussed below, these and other mobile device components may be used to identify starting and stopping points of driving trips, and to determine various driving data such as speeds, driving routes and times, acceleration, braking, and turning data, and other driving conditions and behaviors. The driving analysis software application 222 may store and analyze the data from these mobile device components, and then may use such driving data, alone or in any combination, to perform determinations of eligibility for insurance offers, described in more detail in reference to FIG. 3.

Referring now to FIG. 2B, an example is shown in which the driving data analysis devices 220 include an on-board vehicle system 220b. In this example, on-board vehicle system 220b may correspond to a telematics device, vehicle computer, and/or on-board diagnostics systems. The on-board vehicle system 220b may include some or all of the elements described above with respect to the computing device 101. Additionally, the on-board vehicle system 220b may include similar (or the same) components to those in the mobile user device 220a. For example, a driving analysis software application 222 and a driving data database 223 may be stored in the memory of the on-board vehicle system 220b. The driving analysis software application 222 may be the same or a similar version of the driving analysis software application 222 in FIG. 2A, or may be a different version designed for on-board vehicle systems. Additionally, database 223 in FIG. 2B may be configured to receive and store driving data associated with the vehicle into which the on-board vehicle system 220b is integrated, and/or associated with one or more specific drivers of the vehicle.

The driving analysis software application 222 may be received from the insurance provider server 210 via a vehicle transceiver 226 or other network interface (such as network interface 221 in FIG. 2A). Vehicle transceiver 226 may be installed within the on-board vehicle system 220b or as a separate vehicle component. The vehicle transceiver 226 may be a component of a vehicle telematics system, and may include a cellular modem or other wireless transmission components. In some cases, the vehicle transceiver 226 may be configured to support communication only with one or more specific external systems, such as an emergency services provider, a vehicle manufacturer server, the insurance provider server 210, and the like. In other cases, the vehicle transceiver 226 may be configured to support communications with a wide range of user devices (e.g., user computers, mobile devices), on-board systems in other vehicles, and other external systems. Thus, the vehicle transceiver 226 may include some or all of the same components and functionalities as the network interface 221, such as LAN interface, WAN modem, or wireless transceiver.

On-board vehicle system 220b also includes vehicle sensors and/or sensor interface 227, including hardware and/or software components configured to receive vehicle driving data collected by various vehicle sensors. Using data from vehicle sensors, the driving analysis software application 222 in FIG. 2B may determine various driving data, for example, driving routes and driving time data, driving speeds, acceleration and braking data, steering data, skidding and accident indicators, and data from any other vehicle sensor or control.

For example, a vehicle into which the on-board vehicle system 220b is installed may include vehicle operation sensors capable of detecting and recording various conditions at the vehicle and operational parameters of the vehicle. For example, vehicle sensors may detect and store data corresponding to the vehicle's speed, distances driven, rates of acceleration or braking, and specific instances of sudden acceleration, braking, and swerving. Sensors also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors within and/or accessible to the vehicle sensor interface 227 of the on-board vehicle system 220b may detect and store the external driving conditions, for example, external temperature, rain, snow, light levels, and sun position for driver visibility. Vehicle sensors also may detect and store data relating to moving violations and the observance of traffic signals and signs by the vehicle. Additional sensors may detect and store data relating to the maintenance of the vehicle, such as the engine status, oil level, engine coolant temperature, odometer reading, the level of fuel in the fuel tank, engine revolutions per minute (RPMs), and/or tire pressure.

Certain vehicles may include cameras and/or proximity sensors capable of recording additional conditions inside or outside of the vehicle. For example, internal cameras may detect conditions such as the number of the passengers in the vehicle, and potential sources of driver distraction within the vehicle, such as pets, phone usage, and unsecured objects in the vehicle. External cameras and proximity sensors may detect other nearby vehicles, traffic levels, road conditions, traffic obstructions, animals, cyclists, pedestrians, and other conditions that may factor into driving trip and/or driving data analyses. The vehicle sensor interface 227 may include and/or interface with such cameras and/or proximity sensors to receive the associated image, video, audio, and proximate sensor data.

Additional vehicle sensors within and/or accessible to the vehicle sensor interface 227 may include sensors configured to collect data regarding the number of passengers and the types of passengers (e.g. adults, children, teenagers, pets, etc.) in the vehicle. Additional sensors may be configured to collect data associated with a driver's movements or the condition of a driver, for example, sensors that monitor a driver's movements, such as the driver's eye position and/or head position, etc. Additionally, various sensors may collect data regarding the physical or mental state of the driver, such as fatigue or intoxication, as measured by the movements of the driver or sensors that detect the content of alcohol in the air or blood alcohol content of the driver, such as a breathalyzer.

Referring now to FIG. 2C, another example is shown in which a mobile device 220c (e.g., a smartphone, personal digital assistant, or tablet computer, etc.), is configured to receive and execute a driving analysis software application 222. The mobile device 220c in this example may be similar or identical to mobile device 220a, and may be configured to receive the driving analysis software application 222 from an insurance provider server 210, via a network interface 221 or other application provider. Mobile device 220c may receive and store driving data in database 223, and may execute the driving analysis software application 222 to analyze the driving data and perform determinations for insurance offer eligibility for one or more users and/or vehicles based on the received driving data.

Additionally, in this example, the mobile device 220c includes an on-board vehicle system interface component 225. The on-board vehicle system interface 225 may be implemented with hardware (e.g., an input port or docking station) and/or software (e.g., network interfaces, secure protocols and encryption, etc.), and may be designed and configured to establish communication (using a wired or wireless connection) between the mobile device 220c and an on-board vehicle system 230. For example, a smartphone or tablet computer 220c, which is often carried by a user, may include an on-board vehicle system interface 225 to detect and/or connect to an on-board vehicle system 230 whenever the user is driving (and/or riding as a passenger) in a vehicle. In some cases, an on-board vehicle system interface 225 of a mobile device 220c may be the same as the network interface 221, or may contain some or all of the same hardware and software components. For instance, a smartphone or tablet computer 220c may communicate with a vehicle on-board computer via a LAN interface, WAN modem, or wireless transceiver. After a mobile device 220c establishes communication with an on-board vehicle system 230, which may be a telematics device, on-board diagnostic system, vehicle navigation device, or other vehicle computer system, the mobile device 220c may receive vehicle sensor data collected by various vehicle sensors, including a vehicle-based GPS receiver 224, or any vehicle sensors included in or accessible to the vehicle sensor interface 227. Thus, non-vehicle based mobile devices 220c (e.g., smartphones or tablet computers) may use on-board vehicle system interfaces 225 to receive some or all of the same vehicle sensor data and driving data that is accessible to on-board vehicle systems 220b, discussed above.

Figure 3:
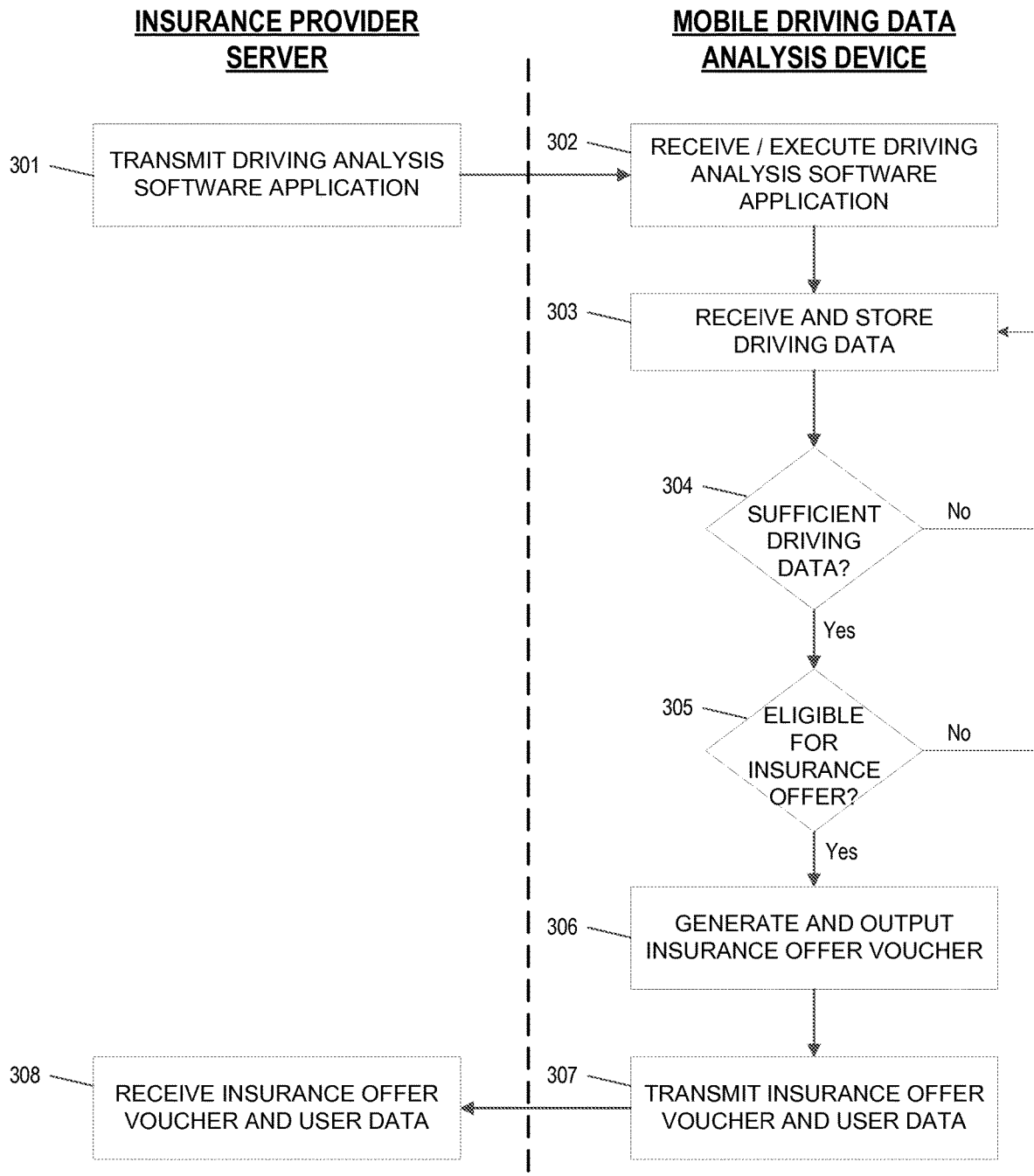
FIG. 3 is a flow diagram illustrating an example of using a driving analysis data software application to analyze driving data and determining eligibility for insurance offers, according to one or more aspects of the disclosure.

In the examples shown in FIGS. 2B and 2C, any of the sensor data discussed above in reference to the vehicle sensors and/or sensor interfaces 227 may be stored as driving data used by the driving analysis software application 222, alone or in any combination, to perform determinations of eligibility for insurance offers, described in more detail in reference to FIG. 3. For example, the driving analysis software application 222 may store and analyze such sensor data to determine various driving data such as driving routes, driving behaviors, driving patterns, vehicle conditions, safe or unsafe driving indicators, etc., and then may determine eligibility for insurance offers based on such driving data.

To perform analyses of driving data and determinations of eligibility for insurance offers, the driving analysis software application 222 also may receive data from additional computer systems (not shown in FIGS. 2A-2C) having data that may be relevant to the driving analyses and insurance eligibility determinations. For example, traffic data storage systems may store data corresponding to the amount of traffic and certain traffic characteristics (e.g., amount of traffic, average driving speed, traffic speed distribution, and numbers and types of accidents, etc.) at various specific locations and times, and weather data storage systems may store weather data (e.g., rain, snow, sleet, hail, temperature, wind, road conditions, visibility, etc.) at different locations and different times. Additional driving databases and systems may store data regarding events such as road hazards and traffic accidents, downed trees, power outages, road construction zones, school zones, and natural disasters. In some examples, the driving analysis software application 222 may retrieve data from one or more of these additional data sources (e.g., traffic databases, weather databases, and governmental databases, etc.) and may use the data as part of the driving data analyses and insurance eligibility determinations discussed below in reference to FIG. 3.

Referring now to FIG. 3, a flow diagram is shown illustrating a process of providing a driving analysis software application from an insurance provider server to a mobile driving data analysis device, which may execute the driving analysis software application to analyze driving data and determine eligibility for various insurance offers.

In step 301, an insurance provider server, such as server 210 described above, may transmit a driving analysis software application to one or more mobile driving data analysis devices, such as any of the devices 220 described above. In some examples, a user of a mobile device such as a smartphone or tablet computer 220a may access a web server or application server of an insurance provider to download a driving data analysis application (e.g., application 222) onto their device 220a. In other examples, a driving data analysis application may be provider to a mobile user device 220a indirectly via a mobile application store or by another third-party application provider. The same or similar techniques may be used for certain on-board vehicle systems 220b, such as telematics devices and on-board diagnostic systems. In some examples, a driving data analysis application 222 may be installed onto an on-board vehicle system 220b by a vehicle manufacturer or an insurance provider.

In certain embodiments, the driving data analysis application 222 may be provided to mobile devices 220 in step 301 on an anonymous basis, so that any users downloading the driving data analysis application 222, as well as their associated mobile devices and/or vehicles, may remain unknown to the insurance provider server 210 and to any intermediary or third-party application provider. In order to provide the driving data analysis application 222 on an anonymous basis, an insurance provider server 210 or other application provider (e.g., a mobile application store) may allow access and downloading to any compatible device (e.g., smartphones, on-board vehicle systems) without requiring any user information or registration data. As discussed below in more detail, providing the driving data analysis application 222 anonymously in step 301 may help ensure that driving data associated with users/vehicles will remain private and secure, and will not be used without the user's authorization.

In step 302, the mobile driving data analysis device 220 may receive and execute the driving data analysis software application 222. As discussed above, different versions of driving data analysis software applications 222 may be compatible with different types of mobile driving data analysis devices 220, depending on the device type (e.g., a smartphone, tablet computer, on-board vehicle system, etc.), the device capabilities, operating system version, and the like. In some examples, the execution of the driving data analysis software application 222 may be user-initiated, that is, an express user action may be required to start and stop the execution of the application 222. In other examples, the application 222 may run as a background process/service which may start up automatically upon startup of the device 220. In some embodiments, the application 222 may be user-configurable (e.g., during or after installation) to run or not run as a background application/service.

In step 303, the mobile driving data analysis device 220 may receive and store driving data associated with one or more users and/or one or more vehicles. The driving data may be collected from various data sources by a data analysis software application 222, or may be collected by one or more other applications and later provided to the data analysis software application 222. In some examples, the driving data received in step 303 may be stored in secure memory on the device 220, for example, in a driving data database 223 or other secure device memory. In other examples, the driving data may be stored off-device in a separate secure driving data repository. For instance, a single user may have multiple mobile devices 220, such as a smartphone 220 and a tablet computer 220, that the user may carry at different times. Additionally, a user may regularly drive two different vehicles, both of which may have an on-board vehicle system 220b configured to receive driving data and execute a data analysis software application 222. In these cases, it may be advantageous to transmit driving data from one or more devices 220 to an associated device 220 (e.g., a user's primary mobile device, or a primary on-board vehicle system, etc.), or to a driving data repository at a user's home computer or other off-site system, in order to combine and analyze all of the available driving data for a single user or group of associated users, or for a single vehicle or group of associated vehicles, for the purpose of determining if such users, vehicles, or groups are eligible for various insurance offers.

To receive driving data in step 303, the mobile driving data analysis device 220 may use the various components of the driving data analysis systems 200a-200c discussed above in reference to FIGS. 2A-2C. For example, a mobile user device 220a may use internal device components such as a GPS receiver 224, accelerometer, compass, cameras, and various other device sensors and components, to collect and determine driving data in step 303. In other examples, mobile devices 220b and 220c may use similar internal device components, as well as vehicle sensor data collected from vehicle sensors and/or sensor interfaces 227, to receive driving data in step 303. In either of these examples, additional driving data may be received in step 303 from other data sources, such as traffic databases, weather databases, and various additional driving databases and systems, as described above.

In certain embodiments, when receiving and storing driving data in step 303, mobile user devices 220a may analyze the received driving data and perform determinations to distinguish driving data from non-driving data, and to identify driving trips and associated drivers. For example, when a user of a mobile user device 220a is walking, running, or biking, or when the user is on a bus, subway, train, or airplane, the data analysis software application 222 may be configured to identify these trips as non-driving trips and to exclude them for the purpose of determining eligibility for various insurance offers. In other examples, even these non-driving trips may be recorded in step 303 and used for determining eligibility for various insurance offers (e.g., offering insurance discounts or incentives to users that use alternate forms of transportation for commuting).

The mobile user devices 220a may be configured to distinguish driving from non-driving (e.g., running, biking, bus trips, subway trips, etc.) trips based on user input and/or automatically based on various device components and sensors. In some examples, the mobile device 220a may be programmed to display user interface screens to allow device users to indicate the beginning and end of driving trips, and/or to indicate the user that is driving. For example, a user may access a user interface screen on a mobile user device 220a (e.g., smartphone or tablet computer) or an on-board vehicle system 220b (e.g., via an in-dash display) to indicate the beginning and/or end of a driving trip for which the user is driving. If a single device 220 collects and stores driving data separately for multiple users, then one or more user interface screens may be provided to allow the user to select which user is the driver for the trip.

In other examples, determination of driving/non-driving activities, and identification of driving trips and drivers may be performed without receiving user input via user interface screens. For example, for driving analysis software applications 222 configured to run as background applications, driving trips and/or drivers may be determined automatically by analyzing the driving data received in step 303. As discussed above, mobile user devices 220a may use internal device components such as a GPS receiver 224, accelerometer, compass, cameras, and various other device sensors and components, to collect driving data. In these examples, the collected data (e.g., GPS data) may be analyzed and the speeds and routes defined by the data may be compared against street databases to determine whether the collected data corresponds to a driving trip or a trip made using another mode of transportation (e.g., walking, train, airplane, etc.). After determining that certain collected data corresponds to a driving trip, the data may be further analyzed in step 303 to determine a driver associated with the driving trip. For example, a driving analysis software application 222 may store driving patterns associated with one or more users (e.g., driving route, time, and day patterns, driving speed, acceleration, and braking tendencies, etc.) to identify drivers associated with specific driving trips.

In other examples, for driving data analysis devices 220 with access to on-board vehicle sensor data (e.g., devices 220b and 220c), the vehicle sensor data may be analyzed to determine the beginning and end of driving trips. For example, times and GPS data may be compared to vehicle ignition data, speed and mileage data, and the like, to determine the beginning and end of driving trips. Additional data analyses may be used to determine specific drivers associated with driving trips. For instance, a driving analysis software application 222 on device 220b or 220c may store driving patterns associated with one or more users (e.g., driving route, time, and day patterns, driving speed, acceleration, and braking tendencies, etc.), as well as other driver settings (e.g., seat position and radio settings, driver voice control recognition, etc.) to identify drivers associated with specific driving trips.

In step 304, the amount of driving data received in step 303 may be compared against one or more sufficient driving data thresholds in order to determine if a large enough sample size of driving data has been collected to determine eligibility for various insurance offers. Driving data thresholds may include time thresholds (e.g., a minimum number of days, weeks, or months that a driving analysis software application 222 has been executing on a device 220), driving time thresholds (e.g., a minimum number of driving hours, driving days, etc.), driving trip thresholds (e.g., a minimum number of driving trips), or driving miles thresholds (e.g., a minimum number of driving miles). Certain sufficient driving data thresholds may apply only to driving times, trips, and miles in which a specific user or member of a group (e.g., the primary device user, a member of a household, etc.) is the driver, while other sufficient driving data thresholds may apply for a user (or group) regardless of whether the user (or a member of the group) was the driver associated with the driving data collected in step 303.

If a sufficient amount of driving data was not received (304: No), then the driving analysis software application 222 may return to step 303 to continue collecting driving data until a sufficient amount is collected to determine eligibility for one or more insurance offers.

If a sufficient amount of driving data was received to determine eligibility for one or more insurance offers (304: Yes), then in step 305 the driving analysis software application 222 may analyze the driving data to determine eligibility for insurance offers. Eligibility for various insurance offers may be determined by the driving analysis software application 222 using any combination of the driving data received in step 303, and using any of the sufficient driving data thresholds discussed above in step 304. For example, a user or group of users may be eligible for an insurance discount, free insurance for a temporary amount of a time, or other incentive (e.g., an improved driver score, safe-driver discount, accident forgiveness, etc.), after an analysis of the driving data associated with the user or group to determine accident-free driving, low-risk driving, and/or safe driving over a threshold period (e.g., an amount of time, an amount of driving time, a number of driving trips, a number of driving miles, etc.). For instance, if the driving data collected in step 302 indicates that a driver has been accident-free for a threshold number of months or years (e.g., 6 months, 1 year, 2 years, . . . 5 years, etc.), then the driving analysis software application 222 may determine that the driver is eligible for free temporary insurance coverage, an insurance discount, or other insurance incentive (e.g., a safe-driver discount, an accident forgiveness credit, etc.). As another example, if the driving data collected in step 302 indicates that a driver is a low-risk driver (e.g., based on the amount of driving, driving times, driving routes, and other factors), then the driver may be eligible for a driver reclassification and a lower insurance rate. As yet another example, if the driving data collected in step 302 indicates that a driver or associated group of drivers (e.g., family, friends, co-workers, or other group of drivers associated with the same vehicle or vehicles) are safe-drivers (e.g., based on factors such as driving speeds, acceleration and braking patterns, the use of vehicle controls, and various other driving behaviors and factors), then the driver or group may be eligible for a safe-driving discount or other insurance incentive.

Various insurance offer determinations performed in step 305 may be based on analyses of the driving data and corresponding determinations that a driver (or group of drivers) is a safe driver and/or a low-risk driver. Such determinations may be based on the driving data received and stored in step 302, for example, driving speeds, driving routes, driving times, acceleration and braking patterns, steering and swerving patterns, and the like, which may be determined from a GPS receiver 224, vehicle sensors 227, and/or other sensors on a mobile device 220a or on-board vehicle system 220b-220c. Safe driver and/or a low-risk driver determinations also may be determined based on the various driving behaviors and the usage of vehicle controls and systems, such as seat-belt usage, radio usage, use of a mobile phone or other communication device while driving, and/or proper use of turn signals, headlights, windshield wipers, hazard lights, etc. Additionally, certain unsafe driving behaviors such as aggressive driving (e.g., tailgating, racing, swerving or skidding) may be identified using vehicle sensors 227 such as cameras, proximity sensors, and horn usage. Such analyses may include identifying instances of impaired or distracted driving, which may be determined based on radio or mobile phone usage, vehicle sensors to detect a number of passengers or pets in the car, breathalyzers or other impaired driver sensors, and other similar data. Insurance offer determinations in step 305 also may be based on corresponding accident-free driving determinations, which may use vehicle sensor data corresponding to vehicle impact sensors, air bag deployment sensors, and the like.

Additionally, any of the insurance offer determinations described herein may be based on data from one or more external data sources, such as weather databases, traffic databases, governmental databases, and any other data sources relevant for determining safe or unsafe driving, high or low risk driving, and accidents or accident-free driving. For instance, a safe-driving or low-risk driving determination in step 305 that analyzes driving speed, acceleration, braking, and steering patterns, driving routes, driving times, and the like, also may retrieve and analyze other relevant factors from external databases using the driving locations and times to further inform the analysis. The driving analysis software application 222 may be configured to correlate the times and locations associated with the driving behaviors (e.g., driving speeds, routes, times, acceleration and steering patterns, seat belt and radio usage, driver distractions, etc.) with the corresponding driving weather (e.g., rain or snow, fog, icy roads, etc.), visibility (e.g., daytime or night driving, dusk or dawn, etc.), traffic conditions (e.g., high traffic or low traffic roads), and other road characteristics and conditions (e.g., speed limits, highway or city driving, paved or unpaved roads, narrow or wide roads, construction or school zones, etc.) as contributing factors in a safe-driving or low-risk driving determination in step 305. Additionally, an external accident database maintained by an insurance company or governmental data source may be used to identify or verify accidents, and to correlate various driving behaviors (e.g., driving speeds, driver distractions, etc.) with occurrences of accidents.

The insurance offer determinations performed in step 305 also may be based on one or more of the driving thresholds discussed above in step 304. For example, a driver may be eligible for a first insurance offer (e.g., a 5% premium discount) after a first threshold is satisfied (e.g., 1,000 miles of accident-free and safe driving), and a second insurance offer (e.g., a 10% premium discount) after a second threshold is satisfied (e.g., 2,500 miles of accident-free and safe driving). Additionally, as discussed above, driving thresholds need not correspond to driving miles. In other examples, eligibility for insurance offers may be determined in step 305 based on an amount of time (e.g., a number of weeks, months, or years of safe driving, low-risk driving, or accident free driving), based on an amount of driving time (e.g., a number of hours of safe driving, low-risk driving, or accident free driving), or based on a number of driving trips (e.g., a number of hours of safe driving, low-risk driving, or accident free driving).

The insurance offers determined in step 305 may correspond to any type of insurance policy offer, an insurance rate/terms offer, an insurance discount, and/or other insurance-related award or incentive. For example, if a driver or group satisfies certain low-risk or safe-driving conditions, the insurance offer in step 305 may be an offer for an automobile insurance policy (e.g., collision, comprehensive, liability, etc.) having certain terms, conditions, and rates (e.g., a premium amount, deductible amount, and length of term) specified as part of the offer. In other examples, an insurance offer in step 305 may correspond to an insurance discount (e.g., a percentage off of an insurance policy premium or deductible), an insurance credit (e.g., a dollar amount that may be applied towards an insurance policy premium or deductible), or an offer for free insurance for a temporary amount of time (e.g., 1 week, 2 weeks, 1 month, etc.). In still other examples, an insurance offer may correspond to an increased driver score, an increase in a coverage amount or term length, forgiveness of one or more accidents (i.e., a guarantee that the driver's insurance rates will not be increased after an accident), or any other insurance award or incentive. Further, as discussed below, the driving analysis software application 222 may be configured to determine eligibility for multiple insurance offers from multiple different insurance providers (e.g., insurance companies, reinsurance companies, financial institutions, etc.).

In some embodiments, the type of an insurance offer may differ depending on whether the driver (or group) is an existing customer of an insurance company. For example, if a driver is not an existing customer of an insurance company, then the insurance offer in step 305 may be an offer for a guaranteed insurance rate or specific insurance terms for a new insurance policy. If the driver is an existing customer of an insurance company, then the insurance offer in step 305 may be an offer for a discount or credit applicable to the customer's current policy. As discussed below, in some cases the driving analysis software application 222 might not know whether the driver is an existing customer at the time that eligibility for the insurance offer is determined in step 305. In such cases, the driving analysis software application 222 may determine whether or not the driver is an existing customer after determining the driver's eligibility for an insurance offer, for example, by asking the driver via a user interface screen on the driver's device 220. In other cases, the eligibility requirements in step 305 may correspond to two (or more) different insurance offers, one for non-customers, and one (or more) for different classifications of existing customers.

After determining that a driver (or group of drivers) is eligible for one or more insurance offers (305: Yes), the driving data analysis application 222 may generate and output an insurance offer voucher to the driver (or group) in step 306. An insurance offer voucher may include data informing the driver of the insurance offer and/or providing the driver with one or more options for accepting the insurance offer. For example, an insurance voucher may include a voucher number, an alphanumeric voucher code, or a hyperlink that is generated by the driving data analysis application 222, and which is recognizable by a server of an insurance provider as corresponding to an insurance offer. Insurance offers may be output in step 306 by displaying the offer on the display screen of the associated device 220 (e.g., a mobile user device 220a or on-board vehicle system 220b), or may be output using various other techniques, such as via voice message, text message, or email to a phone number or email address associated with the driver or group of drivers. Additionally, information may be provided to allow the driver to accept the insurance offer, such as a company number, phone number, and/or hyperlink to allow the user to communicate the insurance voucher information to the insurance provider.

Figure 4A:
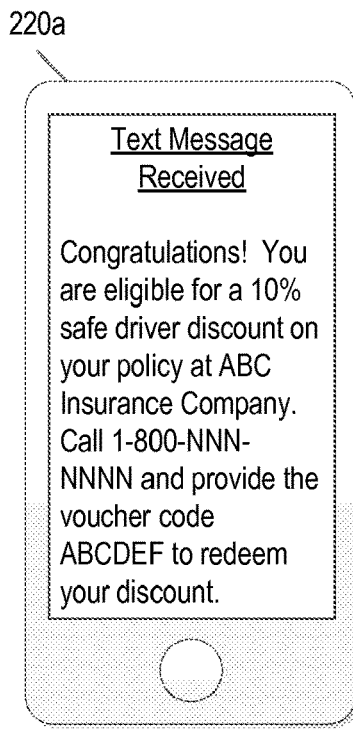
FIGS. 4A and 4B are example user interface screens displaying insurance offer and voucher information, according to one or more aspects of the disclosure.
Figure 4B:
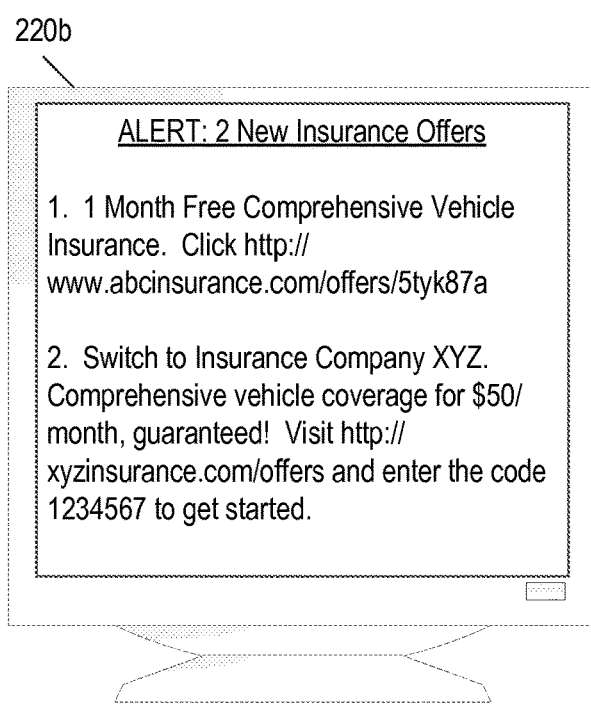

Referring briefly to FIGS. 4A and 4B, two examples of user interface screens are shown including electronic voucher information for insurance offers. In FIG. 4A, a first insurance offer has been sent to a user on a mobile device 220a via text message, indicating that the user is eligible for a discount from the user's current insurance provider, ABC Insurance Company. In FIG. 4B, two new insurance offers for have been displayed on the on-board vehicle system 220b, one offer from ABC Insurance Company and another offer from XYZ Insurance Company. As illustrated in these examples, electronic voucher data may include phone numbers, website addresses, voucher numbers, verification codes, and specifically generated uniform resource locators (URLs) to convey an authenticated offer to an insurance provider.

In some cases, the generation, storage, and usage of insurance offer vouchers may be performed securely by the driving data analysis application 222 to prevent fraud and misuse of the vouchers. For instance, the driving data analysis application 222 may be configured so that any electronic voucher data (e.g., a voucher number/code, a uniform resource locator (URL), etc.) stored within the software code of the application 222, or the software code used to generate the electronic voucher data, is securely stored and/or encrypted to prevent a malicious user from cracking the driving data analysis application 222 to extract or generate insurance offer voucher information. Additionally, the driving data analysis application 222 may be configured so that it will never generate the same voucher information more than once, in order to prevent fraud by users attempting to re-use the same electronic voucher information for multiple drivers or vehicles.

With further reference to FIG. 3, in step 307, the user may control the mobile device 220 to transmit the insurance voucher data, along with user data, to an insurance provider server in order to accept the insurance offer. In step 308, the insurance provider server may receive the insurance voucher data and user data, and may commence the process of insuring the user in accordance with the accepted insurance offer. Insurance voucher data may be transmitted from the mobile device 220 and received by an insurance provider server 210 using various techniques. For example, a user of a mobile device 220 may login to an insurance company server 210 and enter a voucher code received in step 307, or may click a specially generated hyperlink received in step 307 corresponding to the insurance offer voucher. In other examples, the user may contact the insurance provider by phone, email, web chat, or using various other techniques, and a customer service employee of the insurance provider may receive and input the insurance offer voucher into an insurance provider server 210.

In FIG. 3, the device transmitting the insurance offer voucher and user data in step 307 is depicted as the same mobile driving data analysis device 220 performing steps 302-306. However, in other examples the transmitting device in step 307 need not be the same device executing the driving data analysis application 222 and/or performing steps 302-306. For example, if an insurance offer voucher is sent by email, text message, or other technique in step 306, the user may receive the voucher and transmit the voucher to the insurance provider 210 using a separate device, such as a home personal computer. Additionally, in FIG. 3, the computer server transmitting the driving data analysis application 222 in step 301 is depicted as the same server receiving the insurance offer voucher in step 308. However, in other examples, these steps may be performed by different computing devices and/or by different entities. For instance, the driving data analysis application 222 may be distributed in step 301 by an insurance server or third-party application store, while a different insurance server 210 is configured to receive and process the insurance offer voucher and user data in step 308.

As discussed above, the driving data analysis application 222 may be provided to mobile devices 220 in step 301 on an anonymous basis in certain embodiments. Additionally, in some cases, after downloading the driving data analysis application 222, the mobile driving data analysis device 220 may execute the driving data analysis application 222 and perform steps 303-306 without any communication with an insurance provider server 210. In such examples, the logic (e.g., software algorithms) and the various parameters and thresholds (e.g., sufficient driving data thresholds, eligibility thresholds for insurance offers, etc.) for analyzing the driving data and determining eligibility for insurance offers may be contained entirely within the software code of the driving data analysis application 222, so that the driving data analysis device 220 can perform steps 303-306 without needing to communicate with any external server. Thus, eligibility for various insurance offers also may be determined for anonymous drivers, and the insurance offers may be presented to anonymous drivers. For instance, the mobile devices 220 executing the driving data analysis application 222, and their associated users/drivers, need not have any communication with an insurance provider server 210 or other external device until transmitting the insurance offer voucher and user data to the insurance provider server 210 in step 307. In these examples, drivers may wait until receiving insurance offers in step 306 before deciding whether or not to accept the offers and provide their personal user data (e.g., name, address, social security number, etc.) to the insurance provider server 210, in order to accept an offer and begin the process of obtaining insurance.

If the driver decides not to accept an insurance offer, then the driver's driving data need not to be transmitted to the insurance provider server 210. In such cases, neither the insurance provider server 210 nor any other external system may receive any driving data from the device 220 or even any indication that the driving data analysis application 222 has been downloaded and executed by a driver's device 220. If a driver decides to accept an insurance offer, the driver may be required to provide certain personal information and/or vehicle information, such as the driver's name, address, birthdate, social security number, vehicle make and model, driving history, etc., in order to accept the insurance offer. However, even if the driver decides to accept an insurance offer, the driver might only need to provide the insurance offer voucher (e.g., voucher code, hyperlink, etc.) rather than the raw driving data residing on the driver's device 220. Therefore, drivers may accept insurance offers and obtain insurance while still protecting the security and privacy of their driving data, so that data such as driving routes, driving times, accidents, and other driving behaviors and vehicle usages are never transferred off of the driver's own device 220. Additionally, the driving data analysis application 222 may be further configured to erase the driving data from the mobile driving data analysis device 220, to assure drivers that their private driving data will never be transmitted to or used by an insurance provider 210 or any external device or system. For example, a user's driving data may be erased by the driving data analysis application 222 after determining the user's eligibility for one or more insurance offers in step 306, regardless of whether or not the user is determined to be eligible for any insurance offers, and regardless of whether or not the user the user accepts any insurance offers. In other cases, a subset of driving data may be retained on the device 220 to be used for future insurance eligibility determinations.

Additionally, in some embodiments, the insurance offers determined by the driving data analysis application 222, and the insurance voucher data and offer information that is generated and output, may correspond to binding insurance offers. That is, the various insurance offers (e.g., new insurance policy offers, rates/terms, insurance discounts or credits, awards and incentives, etc.) may be guaranteed by the insurance provider in some cases. In some examples, after a driver satisfies the eligibility requirements for an insurance offer (e.g., a determination of safe or low-risk driving over a sufficient driving data threshold), then the driving data analysis application 222 may output a binding insurance offer, even if the driver had not yet provided any personal information or vehicle information. Thus, binding insurance offers may be presented to anonymous drivers and groups of drivers, without any prior knowledge of the driver's identity and characteristics (e.g., gender, age, address, driving history), and without any prior knowledge of the characteristics of the driver's vehicle(s) (e.g., number of vehicles owned or driven regularly, vehicle makes, models, years, etc.). In other cases, the driving data analysis application 222 may collect various different subsets of driver information and/or vehicle information from the driver before outputting a binding insurance offer, while still allowing the identity of the driver and the driver's driving data to remain anonymous. For example, the insurance provider may require a minimum amount of driver and vehicle information, such as the driver's age, zip code of residence, and vehicle make/model, before providing the driver with a binding insurance offer. The driving data analysis application 222 may be configured to collect the required data before presenting the binding insurance offer to the driver.

As discussed above in reference to FIG. 3, the collection and analyses of driving data, and the determination of eligibility for various insurance offers may be performed entirely by a mobile driving data analysis device after receiving a driving analysis software application. In such examples, the software algorithms and eligibility thresholds for insurance offers may be encoded within the driving data analysis software application code, so that the driving data analysis device 220 can analyze the driving data and determine eligibility for insurance offers without needing to communicate with any external server. However, as discussed below in reference to FIG. 5, in other examples an insurance provider computing device (e.g., insurance provider server 210) may be used to receive and analyze driving data, and determine eligibility for various insurance offers.

Figure 5:
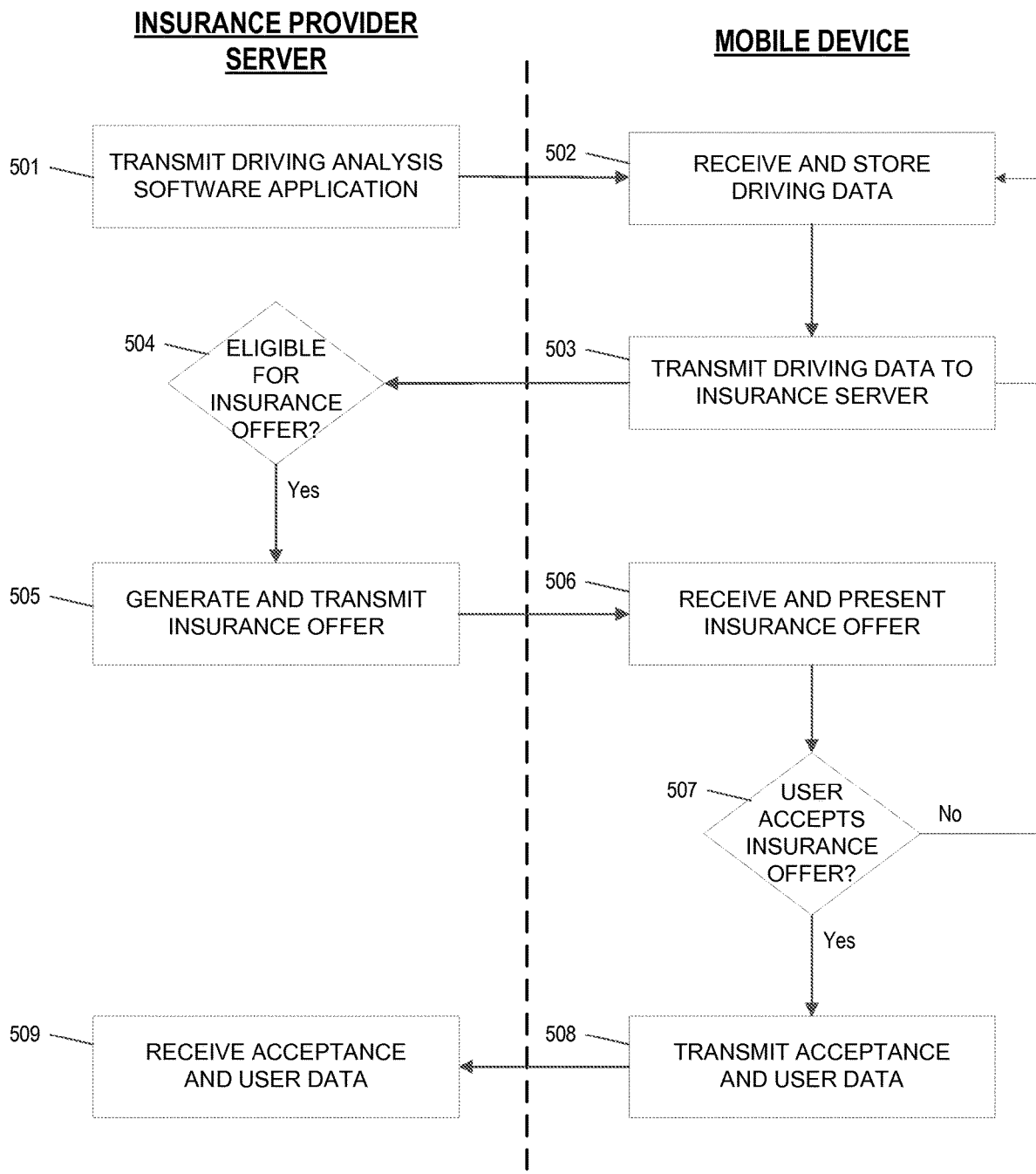
FIG. 5 is a flow diagram illustrating another example of analyzing driving data and determining eligibility for insurance offers, according to one or more aspects of the disclosure.

Referring now to FIG. 5, another example is shown illustrating a process of analyzing driving data and determining eligibility for various insurance offers. The example process illustrated in FIG. 5 may be implemented in various different systems, such as driving data analysis systems 200a-200c. In such examples, an insurance provider server 210 may communicate with one or more computing devices 220, for instance, mobile devices 220a and/or on-board vehicle systems 200b.

In step 501, an insurance provider server, such as server 210 described above, may transmit a driving analysis software application to one or more mobile devices 220 (e.g., smartphones, tablet computers, on-board vehicle systems). In some examples, step 501 may be similar or identical to step 301, discussed above. Step 501 also may be optional in certain embodiments. As discussed below, in this example process, the determination of eligibility for insurance offers may be performed partially or entirely by an insurance provider server 210 rather than by the mobile device 220. Therefore, in some embodiments, a driving analysis software application need not be transmitted to the mobile device 220. Rather, the mobile device 220 may be configured to collect and transmit driving data without needing a specialized driving analysis software application from an insurance provider. For instance, a mobile device 220 may use a third-party driving data collection application, and/or may use predetermined formats and protocols for collecting and transmitting driving data, instead of using a driving analysis software application 222 from an insurance provider.

In step 502, the mobile device 220 may receive and store driving data associated with one or more users and/or one or more vehicles. In some examples, step 502 may be similar or identical to steps 302-303, discussed above. For instance, the mobile device 220 may execute a received driving data analysis software application 222 and/or other techniques to collect the driving data from any of the various data sources discussed above (e.g., mobile device components, vehicle sensors, other external data sources, etc.). As discussed above in step 303, the driving data collected may be stored in secure memory on the mobile device 220, or may be stored off-device in a separate secure driving data repository.

In step 503, the mobile device 220 may transmit the driving data collected in step 502 to one or more insurance provider computing devices (e.g., insurance server 210). In some cases, one or more mobile devices 220 (e.g., smartphone, on-board vehicle system, etc.) each may transmit their driving data to multiple different insurance providers (e.g., insurance companies, reinsurance companies, financial institutions, etc.) in step 503, so that the user/driver may potentially receive competing insurance offers from different insurance providers. When transmitting the driving data, mobile devices 220 and/or insurance provider servers 210 may use, for example, secure data transmission protocols and/or encryption, such as FTP, SFTP, and/or PGP encryption. In some examples, a secure web service may be provided by an insurance provider server 210, using SSL, TLS, HTTP, and/or HTTPS for transmitting driving data.

In some embodiments, the driving data transmitted in step 503 may correspond to raw driving data collected by the various sensors in step 502. For example, the mobile device 220 may format, compress, and/or transmit raw driving data such as vehicle locations (e.g., GPS coordinates) and times, along with various vehicle operational data (e.g., speed, acceleration, braking, steering, etc.), driving behavior data (e.g., turn signal, seat belt and radio usage, driver distraction data, etc.), and any other driving data discussed above. In other cases, the mobile device 220 may be configured to analyze the raw driving data, and then generate and transmit only summary driving data, for example, averages of miles driven per day/week/month/etc., average driving speeds, average driving acceleration, braking, and steering patterns, average driving times, turn signal and seat belt usage patterns, average driving road and weather conditions, and the like, to an insurance provider server 210.

Additionally, as shown in FIG. 5, the mobile device 202 may transmit driving data to the insurance provider server 210 (arrow 504 to 505), while continuing to receive and store additional driving data (arrow 504 to 503). In some cases, the mobile device 202 may continuously collect driving data and periodically transmit the most recent driving data to one or more insurance providers to periodically check for insurance offer eligibility. In such cases, the mobile device 202 may transmit driving data periodically based on an amount of time elapsed, an amount of driving time logged, a number of miles driven, and/or a number of driving trips since a previous transmission of driving data. The mobile device 202 also may implement one or more sufficient driving data thresholds, as discussed above in step 304. In some cases, the mobile device 220 may be prompted by an insurance provider to transmit their driving data at specific times, for example, by a broadcast communication from the insurance provider server 210 to several mobile devices 220 announcing the start of a new insurance offer (e.g., discount or program), or by a transmission from an insurance provider server 210 to a specific mobile device 220 indicating that the device 220 may be eligible for a new analysis of its updated driving data and a new determination of eligibility for one or more insurance offers. Additionally, although FIG. 5 depicts a transmission of driving data to a single insurance provider server 210, in other examples a mobile device 220 may transmit driving data to multiple different insurance provider servers 210, and may potentially receive multiple competing insurance offers from the different insurance providers.

In step 505, the insurance provider server 210 receives the transmitted driving data from the mobile device 220, and uses the driving data to determine the eligibility of a user or vehicle associated with the mobile device 202 for an insurance offer. The determinations in step 505 may be similar or identical to the insurance offer eligibility determinations discussed above in step 305; however, the eligibility determinations in this example may be performed by the insurance provider server 210 rather than the mobile device 202. In some examples, the insurance provider server 210 may be configured to perform additional analyses and/or determinations based on the received driving data from one or more mobile devices 220. For example, the insurance provider server 210 may be configured to periodically change a set of insurance offer thresholds, and may re-determine the eligibility for the insurance offers based on the updated thresholds. For instance, an insurance provider seeking to attract additional customers from one month to the next may lower certain insurance offer eligibility thresholds, and may re-analyze sets of previously received driving data with the lower thresholds in order identify additional eligible vehicles and/or drivers. Additionally, the insurance provider server 210 may use the driving data from multiple devices 220 to create additional insurance offers and/or driving thresholds. For instance, the insurance provider server 210 may analyze driving data received from a number of different mobile devices 220, and may make an insurance offer to a top percentage (e.g., 1%, 5%, 10%, . . . , etc.) of the safest or lowest risk drivers/vehicles.

In step 506, after determining that the driving data received from the mobile device 202 is eligible for one or more insurance offers (505: Yes), the insurance provider server 210 may generate and transmit the insurance offer to the mobile device 220. In various examples, the insurance offer may be transmitted to the mobile device 220 via text message, a web-based user interface, or another user interface screen or notification system (e.g., an alert/notification to an on-board vehicle system 220). Additionally, insurance offers need not be transmitted to the mobile device 220 from which the driving data was received, but may be transmitted to another associated computing device, and/or may be send using other techniques such as phone, email, conventional mail delivery, or other media, to a user associated with the mobile device 220. For instance, the insurance provider server 210 may initiate the sending of an offer to an email address, phone number, or a physical address associated with a user or owner of the device 220 or the associated vehicle, in instances when the insurance provider server 210 has such user/owner information.

In some cases, the insurance offer transmitted in step 506 may include voucher data, such as a voucher number, an alphanumeric voucher code, or a specially generated hyperlink which is recognizable by the insurance provider server 210 as corresponding to an insurance offer. As discussed above, the voucher data may be unique data generated specifically for the mobile device 220 and/or the received driving data. The voucher data may be securely generated, stored, and transmitted, to prevent fraud and misuse of insurance offer vouchers. In other cases, the insurance offer transmitted in step 506 need not include voucher data. In certain examples, the insurance offer may be transmitted via a secure communication session to the mobile device 220 (e.g., a secure web-browsing session, client-server software application, or secure transmission to on-board vehicle system, etc.), so that the offer might only be presented to and accepted by the user of the mobile device 220 from which the driving data was received.

As discussed above, the insurance offer transmitted in step 506 also may be a binding insurance offer in some instances, which may be guaranteed to the driver and/or vehicle by the insurance provider. Additionally, some binding insurance offers may be provided on an anonymous basis, that is, without any driver or vehicle information, or with only limited driver and vehicle information. For instance, the insurance provider server 210 may analyze the driving data in step 505, and may generate and transmit an insurance offer to a mobile device 220 in step 506, without any knowledge of the identity and characteristics of the drivers and/or vehicles associated with the mobile device 220 and the received driving data. In other examples, the insurance provider server 210 may collect various different subsets of driver information and/or vehicle information via the mobile device 220, before determining and transmitting a binding insurance offer (e.g., the driver's age, the zip code of residence, and/or vehicle make and model, etc.), but might not collect other personal driver data (e.g., gender, race, driving history, etc.).

Although not in shown in FIG. 5, the insurance provider server also may determine in step 505 that the received driving data is not eligible for an insurance offer (505: No). In such cases, the insurance provider server 210 may take no action, or may generate and transmit a notification to the mobile device 220 indicating that the vehicle/driver is not eligible for an insurance offer at the present time. When generating and transmitting a notification indicating that the vehicle/driver is not eligible for an insurance offer, the insurance provider server 210 also may transmit certain driving analysis results back to the mobile device 220, for example, a driver score or rating, an indication of how close the driver data was to qualifying for the insurance offer, and/or customized driving recommendations based the received driving data. This data may encourage the driver to adjust his/her driving behaviors and patterns, increasing the likelihood that the driver may be eligible for future insurance offers based on future driving data.

In step 506, the insurance offer may be presented to a user via the mobile device 220 (e.g., smartphone, tablet computer, on-board vehicle system, etc.), or using another computing device, and in step 507 the user may accept or decline the insurance offer via a user interface of the mobile device 220 or other computing device. If the user accepts the offer (507: Yes), an indication of acceptance may be transmitted, along with certain user data, to the insurance provider server 210 in step 508. The functions performed by the mobile device 220 in steps 506-508 may be similar or identical those described above in reference to steps 306-307. For example, the insurance offer may be presented to the user in step 506 via a web-based user interface, client software application, on-board vehicle display, or the like, and the user may control the mobile device 220 in step 307 to indicate acceptance of the offer via the same or a different user interface. In some cases, the user may input insurance voucher data received in step 506 via one communication media (e.g., text message), into a separate user interface (e.g., an insurance provider web page) to accept the insurance offer in step 507. Additionally, in some cases, the user may be required to provide certain user data when accepting the insurance offer in steps 507-508. For instance, if the insurance offer presented to the user in step 506 was determined anonymously by the insurance provider, based limited driver and/or vehicle information (or no driver and/or vehicle information), then the user may be required to provide certain driver data, such as name, address, social security number, etc., and certain vehicle data, such as make, model, year, etc., to the insurance provider server 210 in order to accept the insurance offer and obtain insurance.

In step 509, the insurance provider server 210 may receive indication of acceptance and/or user data from the mobile device 220, and may commence the process of insuring the user in accordance with the accepted insurance offer. The functions performed by the insurance provider server 210 in step 509 may be similar or identical those described above in reference to steps 308. For example, the insurance provider server 210 may receive the acceptance and user data via web-browser based user interface or other client-server software user interface from the user's mobile device 220 or on an on-board vehicle system 220.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A mobile driving data analysis computing device, comprising:
    memory units comprising volatile hardware memory units, the memory units configured to store thereon vehicle driving data; and
    one or more processors, the one or more processors configured to analyze vehicle driving data;
    wherein the mobile driving data analysis computing device is configured to store and execute a driving analysis software application, the driving analysis software application programmed to access and employ the one or more volatile hardware memory units and the one or more processors to:
    identify a first vehicle sensor system proximate to the mobile driving data analysis computing device;
    establish a communication session with a vehicle sensor system;
    receive, from the vehicle sensor system, sensor data, including navigation data, wherein the navigation data comprises Global Positioning System (GPS) data, and process the sensor data to generate driving data and store the driving data associated with a user of the mobile driving data analysis computing device;
    analyze the navigation data to determine a driving trip start and a driving trip end;
    store the navigation data between the driving trip start and the driving trip end, wherein the driving data comprises the navigation data between the driving trip start and the driving trip end;
    receive, from an external data source, external data and correlate the external data to the driving data by using at least one of a time or a location associated with the driving data and the external data, wherein the external data relates to at least one of traffic or weather;
    compare the driving data to one or more driving thresholds encoded into the driving analysis software application and generate thereby a comparison of the driving data to the driving thresholds encoded into the driving analysis software application;
    determine if an amount of the driving data exceeds a minimum threshold amount of driving data required to determine an eligibility for the insurance offer, wherein the minimum threshold amount of driving data comprises at least one of time threshold, a driving time threshold, a driving trip threshold, and a driving miles threshold;
    upon the comparison resulting in a positive indication that sufficient driving data has been received, determine the eligibility for an insurance offer based on the driving data and the external data;
    generate thereby a determination of the eligibility for the insurance offer; and
    output the determination of the eligibility for the insurance offer to one or more electronic devices.

2. The mobile driving data analysis computing device of claim 1, wherein the driving analysis software application is further programmed to access and employ the memory units and processors to:
    erase the driving data associated with the user of the mobile driving data analysis computing device, after determining the eligibility for the insurance offer.

3. The mobile driving data analysis computing device of claim 1, wherein determining the eligibility for the insurance offer comprises:
    executing one or more algorithms encoded into the driving analysis software application, wherein the determination of the eligibility for the insurance offer does not involve communication between the mobile driving data analysis computing device and an external computing device subsequent to receiving the sensor data.

4. The mobile driving data analysis computing device of claim 1, wherein the insurance offer is a binding offer associated with an insurance provider.

5. The mobile driving data analysis computing device of claim 4, wherein outputting the indication of the eligibility for the insurance offer comprises generating an electronic voucher for an insurance product offered by the insurance provider.

6. The mobile driving data analysis computing device of claim 1, wherein the determination of the eligibility for the insurance offer is not based on vehicle characteristics associated with the driving data.

7. The mobile driving data analysis computing device of claim 1, wherein the determination of the eligibility for the insurance offer is not based on driver characteristics associated with the driving data.

8. The mobile driving data analysis computing device of claim 1, wherein receiving the sensor data and storing the driving data comprises:

receiving a first user input indicating the start of a first driving trip;
receiving a second user input indicating the end of the first driving trip; and
collecting driving data between first user input and the second user input.

9. A driving data analysis system comprising:
an insurance provider server; and
one or more driving data analysis computing devices, wherein the insurance provider server comprises:
one or more processors;
one or more nonvolatile hardware memory units; and
one or more networking components, wherein the insurance provider computer server is configured to access and employ the one or more memory units and the one or more processors to:
transmit a driving analysis software application, via the one or more networking components, to the one or more driving data analysis computing devices, the driving analysis software application containing software code to determine conditions for one or more insurance offers based on driving data;
wherein each of the one or more driving data analysis computing devices comprises:
one or more volatile hardware memory units, the memory units configured to store thereon vehicle driving data;
wherein the driving data analysis computing devices is configured to receive, store, and execute the driving analysis software application, the driving analysis software application programmed to access and employ the one or more memory units and the one or more processors of the driving data analysis computing device to:
identify a first vehicle sensor system proximate to the driving data analysis computing device;
establish a communication session with a vehicle sensor system;
receive, from the vehicle sensor system, sensor data including navigation data, wherein the navigation data comprises Global Positioning System (GPS) data, and process the sensor data to generate the driving data and store the driving data associated with a user of the driving data analysis computing device;
analyze the navigation data to determine a driving trip start and a driving trip end of a driving trip;
store the navigation data between the driving trip start and the driving trip end, wherein the driving data comprises the navigation data between the driving trip start and the driving trip end;
receive, from an external data source, external data and correlate the external data to the driving data by using at least one of a time or a location associated with the driving data and the external data, wherein the external data relates to at least one of traffic or weather;
compare the driving data to one or more driving thresholds encoded into the driving analysis software application and generate thereby a comparison of the driving data to the driving thresholds encoded into the driving analysis software application;
determine if an amount of the driving data exceeds a minimum threshold amount of driving data required to determine an eligibility for the insurance offer, wherein the minimum threshold amount of driving data comprises at least one of time threshold, a driving time threshold, a driving trip threshold, and a driving miles threshold;
upon the comparison resulting in a positive indication that sufficient driving data has been received, determine the eligibility for an insurance offer based on at least one of the driving data and the external data; and
output a determination of the eligibility for the insurance offer to one or more electronic devices.

10. The driving data analysis system of claim 9, wherein the one or more driving data analysis computing devices comprise mobile user devices.

11. The driving data analysis system of claim 9, wherein the one or more driving data analysis computing devices comprise on-board vehicle computer systems.

12. The driving data analysis system of claim 9, wherein the insurance provider computer server is further configured to access and employ the one or more memory units and the one or more processors to:
receive, from a mobile driving data analysis computing device of the one or more mobile driving data analysis computing devices, an electronic voucher generated by the driving analysis software application, the electronic voucher corresponding to an insurance product offer.

13. The driving data analysis system of claim 9, wherein the driving analysis software application is further programmed to access and employ the one or more memory units and the one or more processors to:
erase the driving data associated with the user of a driving data analysis computing device of the one or more driving data analysis computing devices, after determining the eligibility for the insurance offer.

14. The driving data analysis system of claim 9, wherein determining the eligibility for the insurance offer by a first driving data analysis computing device comprises:
executing one or more algorithms encoded into the driving analysis software application, wherein said determining the eligibility for the insurance offer does not involve communication between the first driving data analysis computing device and an external computing device subsequent to receiving the sensor data.

15. The driving data analysis system of claim 9, wherein receiving the sensor data and storing the driving data comprises:
receiving a first user input, via an input of a driving data analysis computing device, indicating the start of the driving trip;
receiving a second user input, via an input of the driving data analysis computing device, indicating the end of the driving trip; and
collecting, as the driving data, data corresponding to a time interval between the first user input and the second user input.

* * * * *